UNITED STATES PATENT OFFICE.

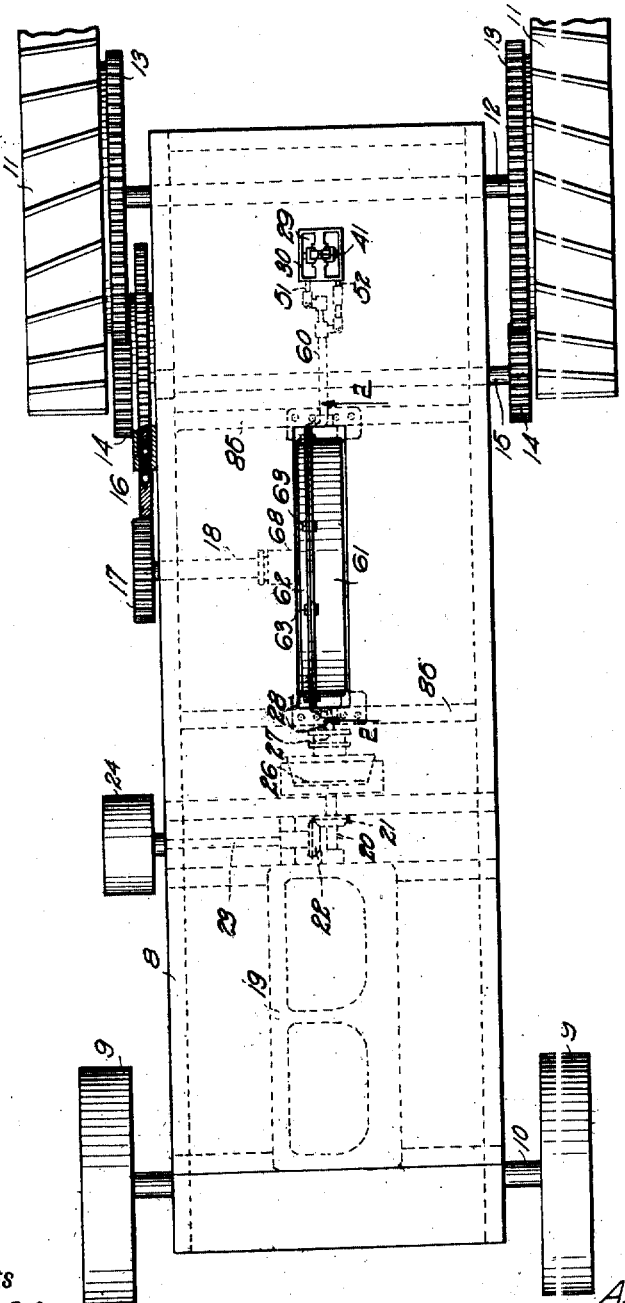

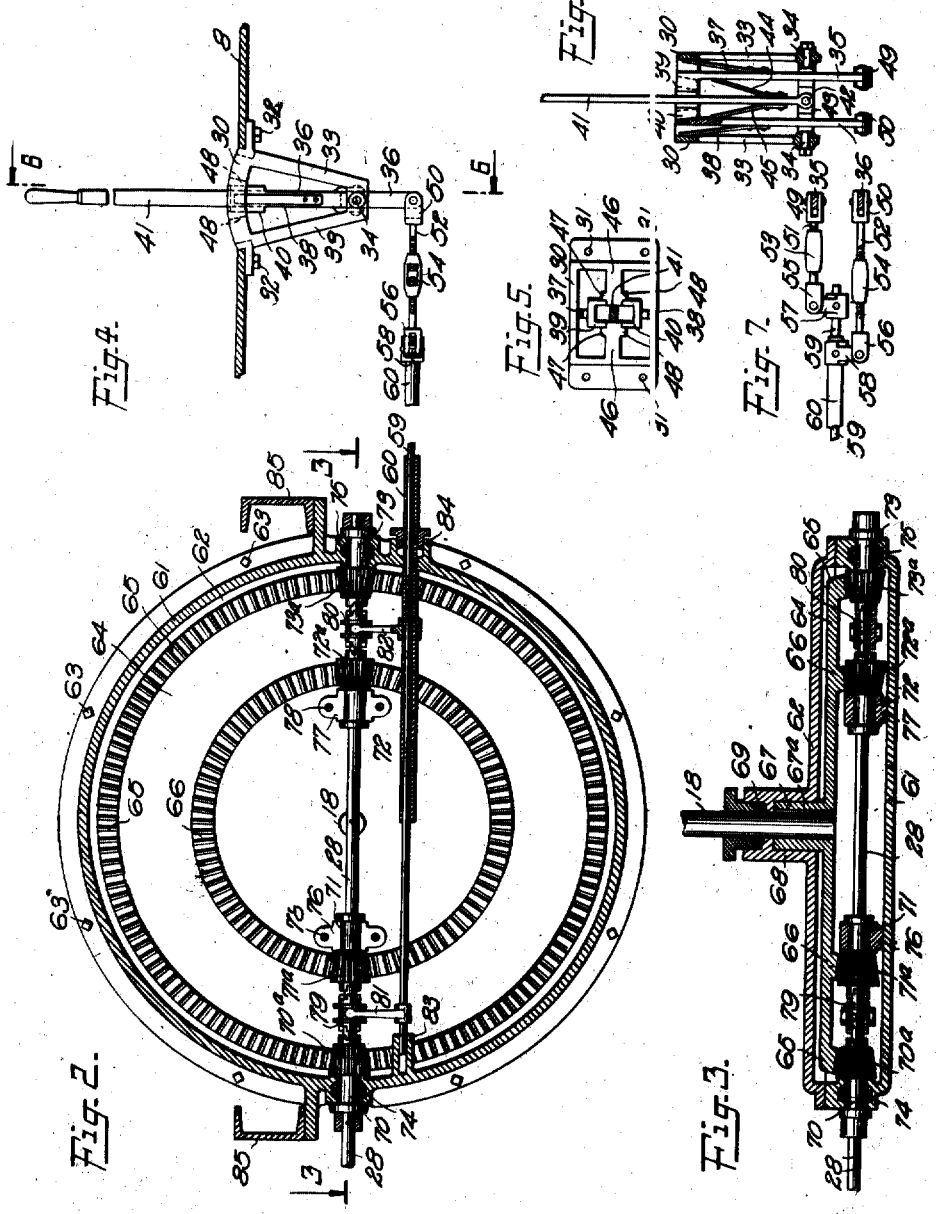

ALVIN ROSS OGBURN, OF DES MOINES, IOWA.

DRIVING MECHANISM FOR TRACTORS.

1,223,099. Specification of Letters Patent. Patented Apr. 17, 1917.

Application filed December 24, 1915. Serial No. 68,321.

*To all whom it may concern:*

Be it known that I, ALVIN R. OGBURN, a citizen of the United States, and a resident of Des Moines, in the county of Polk and State of Iowa, have invented a new and Improved Driving Mechanism for Tractors, of which the following is a full, clear, and exact description.

My invention relates to tractors and more particularly to the gearing and means for controlling the same, the purpose of my invention being to enable the operator to handle the tractor by aid of a single hand lever, under such conditions that the operator can readily change the speed of the tractor whether the machine be traveling forward or backward and can also reverse the direction of travel, all by the manner in which he manipulates the single hand lever.

My invention relates to the gearing of tractors and parts related thereto for the purpose of increasing the general efficiency of these parts.

As my invention may assume different forms, I find it impracticable to describe all of them. For the sake of simplicity therefore, I will describe one typical form of my invention.

Reference is made to the accompanying drawings, forming a part of this specification, and in which like reference characters indicate like parts.

Figure 1 is a plan view of a tractor equipped with my invention;

Fig. 2 is a section on the line 2—2 of Fig. 1, looking in the direction of the arrow and showing a part of the gearing;

Fig. 3 is a section on the line 3—3 in Fig. 2, looking in the direction of the arrow;

Fig. 4 is a side view partly in elevation and partly in section, showing the hand lever and parts immediately associated therewith for controlling the gearing;

Fig. 5 is a view partly in plan and partly in section of the mechanism shown in Fig. 4;

Fig. 6 is a section on the line 6—6 in Fig. 4 looking in the direction of the arrow; and Fig. 7 is a detail view partly in plan and partly in section of part of the connections from the hand lever to the gearing.

The tractor as a whole is shown in Fig. 1 and is provided with a frame or body member 8, at one end of which are a pair of load wheels 9 mounted upon an axle 10. At the opposite end of the frame or body 8, are a pair of traction wheels 11, mounted upon a revoluble shaft 12. Connected rigidly with the traction wheels 11, are gear wheels 13, and meshing with these gear wheels are gear pinions 14 carried by a revoluble shaft 15. Driven from one of the pinions 14, is any approved differential gear designated generally by the numeral 16, and which in turn drives a gear pinion 17, the latter being mounted rigidly upon a revoluble shaft 18.

A prime mover, is shown at 19 and may be of the usual or any desired construction. It is provided with a revoluble shaft 20 and mounted rigidly upon the latter is a bevel pinion 21, which meshes with another bevel pinion 22, the latter being mounted rigidly upon a revoluble shaft 23. This shaft carries a pulley 24, which in practice may be brought into use when power is being conveyed from the tractor to any machine extraneous to the tractor. A clutch is shown at 26 and is provided with a neck 27 to be engaged by a clutch fork or other suitable member for enabling the operator to actuate the clutch. Connected with the clutch 26 is a shaft 28, which is controllable by aid of the clutch and is used for transmitting power from the prime mover to the gearing, shown in Figs. 2 and 3.

The frame or body member 8 of the tractor is provided with an opening 29 and extending through this opening is a frame 30. This frame is held in position by bolts 32, which extend through holes 31, as may be understood from Figs. 4 and 5. The frame 30 is provided with a pair of downwardly extending V-shaped portions 33 and extending through the bottom ends of these V-shaped portions is a shaft 34. A pair of dog levers 35—36 are carried by the shaft 34 and are adapted to swing thereupon. The dog lever 35 carries a leaf spring 37 extending obliquely upward and engaging the adjacent inner portion of the frame 30. The dog lever 36 carries a leaf spring 38 similar to the leaf spring 37 and which engages the inner surface of the frame 30 upon the side thereof opposite the point of engagement of the spring 37. The dog lever 35 is provided with a lug 39, having a substantially U-shape in cross section, as may be understood from Fig. 5. The dog lever 36 carries a lug 40, similar to the lug 39. A hand lever 41 extends through the frame 30 and is mounted upon a pin 42 carried by a sleeve 43, the latter being supported by the shaft 34. The hand lever 41 is adapted to rock upon the pin 42 and the sleeve 43 can rock upon the shaft 34. Hence, the hand lever 41 has practically a universal movement within limits permitted by the size of the frame 30. The hand lever 41 carries two leaf springs 44—45 disposed upon its opposite sides and extending obliquely upward, these two leaf springs respectively engaging the dog levers 35 and 36. The frame 30 is provided with a pair of tongues 46 extending toward each other, as indicated in Fig. 5. These tongues are provided with lugs 47—48 and are so arranged that the U-shaped lug 39 of the dog lever 35 may find lodgment between the lugs 47 and the U-shaped lug 40 of the dog lever 36 may lodge between the lugs 48. Pivoted to the lower ends of the dog levers 35—36 are heads 49—50, the head 49 forming a part of a pitman 51 and the head 50 forming a part of a somewhat longer pitman 52. The pitman 51 carries a turn buckle 53, whereby its length may be adjusted. The pitman 52 carries a turn buckle 54 for adjusting its length. The pitman 51 carries a head 55 and the pitman 52 is provided with a head 56. The head 55 is pivotally connected with an arm 57 and the head 56 is also pivotally connected with an arm 58. A thrust rod 59 is connected rigidly with the arm 57, and the arm 58 is secured rigidly upon a sleeve 60. This sleeve and the thrust rod 59 are movable independently of each other.

The operator by grasping the hand lever 41 and pressing it sidewise in one direction, say toward the dog lever 35, causes the spring 44 to press hard against this dog lever, so that the U-shaped lug 39 is disengaged from the lugs 47, but this does not take place until the lever 41 fits neatly into the U-shaped lug 39. As soon, however, as the U-shaped lug 39 clears the lugs 47, the operator can swing the hand lever 41 either forward or backward in the general direction of travel of the tractor. Similarly, the operator by pressing the hand lever 41 toward the dog lever 36, so that the lever lodges within the U-shaped lug 40, can by further pressure dislodge the U-shaped lug 40 from engagement with the lugs 48 and this leaves the hand lever free to swing either forward or backward under control of the operator's hand, the hand lever carrying the dog lever 36 with it. Such being the case, the operator by moving the hand lever 41 and actuating the dog levers 35—36, as just described, can cause the pitmen 51—52 to move the thrust rod 59 and sleeve 60; that is to say, by manipulating the single hand lever 41, the operator can move the thrust rod 59 in either of two directions and can move the sleeve 60 in either of two directions, but he is unable to move both the thrust rod 59 and the sleeve 60 at the same instant. Moreover, after moving one of the members 59 or 60 from its normal position, the operator is unable to move the other one until the member first moved is restored to its normal position. If, for instance, the lever 41 be swung to the right according to Fig. 6 and then pushed forward or backward, so as to move the thrust rod 59, the operator must necessarily bring the U-shaped lug 39 and dog lever 35 back to normal position, before he can shift the hand lever 41 into engagement with the U-shaped lug 40, and this step is absolutely essential to move the sleeve 60.

Supported by the frame work of the tractor, is a casing 61, provided with a head 62, the latter being held in position by bolts 63. Mounted within the casing, is a large gear wheel 64 carrying a pair of annular racks 65—66, the rack 66 being of smaller diameter and concentric to the rack 65. The gear wheel 64 is provided with a hub 67, the latter being secured by a key 67ᵃ upon the shaft 18. As may be understood from Fig. 3, this shaft extends through a bearing 69, having in this instance, the form of a stuffing box. Mounted loosely upon the shaft 28, are a number of clutch members 70—71—72—73, each having generally the form of a sleeve. The clutch members are severally provided with bevel pinions 70ᵃ—71ᵃ—72ᵃ—73ᵃ, connected rigidly therewith, and severally adapted to be turned by the shaft 28 when in operative relation thereto. The clutch member 70 extends through a bearing 74 and the clutch member 73 extends through a similar bearing 75. The clutch members 71 and 72 are mounted in bearings 76—77, the latter being secured to the casing by fastenings 78, as may be understood from Fig. 2. Mounted upon the shaft 28 are two clutch members 79—80. These clutch members are each double handed, as shown in Figs. 2 and 3 and are each splined in position, so as to turn with the shaft 28 and yet to be movable slightly in the direction of the length thereof. Engaging the clutch members 79—80 are clutch forks 81—82, the clutch fork 81 being mounted rigidly upon the thrust rod 59 and the clutch fork 82 being secured fast upon the movable sleeve 60. A bearing 83 supports the adjacent end of the thrust rod 59 in such manner as to accommodate the end thrust of this rod and a bearing 84 engages the sleeve 60, so as to permit of the endwise movement of the latter. The casing 61 is supported upon cross beams 85.

Since the operator by aid of the hand lever 41 can move the thrust rod 59 in the direction of its length, as above described, it is evident that he can cause the clutch fork 81 to shift the clutch member 79 in either of two directions. By doing this, he can bring it into engagement with the clutch member 70, or with the clutch member 71. Similarly, since by aid of the hand lever 41, he can move the sleeve 60 in the direction of its length, he can cause the clutch fork 82 to shift the clutch member 80 in either of two directions, thus bringing it into engagement with the clutch sleeve 72 or the clutch sleeve 73, as the case may be. It is also evident that since the operator is unable to move the thrust rod 59 and the shaft 60 at the same instant and since after moving either of these members out of its normal position, he must restore it before he can move the other out of its normal position, it follows that the clutch members 79—80 cannot both be out of normal position at the same instant. The normal position of the clutch member 79 is midway between the clutch members 70 and 71. The normal position of the clutch member 80 is midway between the clutch members 72 and 73. Hence if the clutch member 79 be in engagement with either the clutch member 70 or the clutch member 71, the clutch member 80 must necessarily be disconnected from operative relation with the clutch members 72 and 73. When the clutch member 80 is in operative relation with either of the two clutch members just mentioned and with which it is immediately associated, the clutch member 79 must for the moment be disconnected from the clutch members 70 and 71.

The gear wheel 64 being driven constantly in a particular direction, say clockwise according to Fig. 2, it is plain that if the clutch member 79 is shifted in one direction, the tractor will be given a predetermined speed. If shifted in the opposite direction, the tractor will be given a different speed, the general movement of the machine, however, being in the same direction for both of these speeds. If, instead of this, the clutch member 80 be shifted first in one direction and then in the other, the tractor will move in a direction opposite to that contemplated by the condition just described and the speed of the machine will vary according to the direction of movement of the clutch member 80.

It is impossible for power to be supplied to more than one of the gear pinions 70ª—71ª—72ª—73ª at the same instant and no matter how the machine may be handled, the danger of breakage from this cause is abolished.

As may be readily seen from the foregoing remarks, the operator by handling the hand lever 41 can give the tractor either of two predetermined speeds in each of its two directions of travel and may also reverse the direction of travel, all without taking his hand from the single hand lever employed.

I do not limit myself to the precise construction shown, as variations may be made therefrom, without departing from the spirit of my invention.

Having thus described my invention, I claim as new and desire to secure by Letters Patent:

1. The combination of a single hand lever, a pair of dog levers mounted upon opposite sides of said hand lever and each provided with a lug, adapted to be engaged by said hand lever, the hand lever when in engagement with the lug of one of said dog levers being out of engagement with the lug of the other dog lever, change speed gearing connected with one of said dog levers and controllable thereby; and change speed gearing connected with the other of said dog levers and controllable thereby.

2. In a tractor controlling mechanism, the combination of a revoluble shaft, means for turning the same constantly in one direction, a pair of clutch members splined upon said revoluble shaft a thrust rod connected with one of said clutch members, a movable sleeve connected with the other clutch member, a pair of levers, a shaft on which said levers are mounted to swing, members connecting said levers respectively with the thrust rod and the movable sleeve, and a single hand lever carried by said shaft for actuating either of said levers for shifting said clutch members one at a time from a predetermined normal position; other clutch members located to be engaged by said first-mentioned clutch members; and change-speed mechanism connected with said clutch members thus located and controllable by the same.

3. In a device of the character described, change-speed gearing for driving a tractor in one direction of travel, change-speed gearing for driving said tractor in the opposite direction of travel, a thrust rod movable in the direction of its own length for throwing said first-mentioned change-speed gearing into and out of action, a movable sleeve connected with said second-mentioned change-speed gearing for throwing the same into and out of action, a single hand lever, and mechanism connected with said single hand lever and said thrust rod and said movable sleeve for enabling both of said change-speed gearings to be controlled from said single hand lever.

4. The combination of change-speed gearing for driving a tractor in one direction of travel, change-speed gearing for driving said tractor in the opposite direction of travel, a single hand lever, dog levers having members for engagement by the single hand lever to actuate the dog levers, the said hand lever when in operative engagement with one of said dog levers being out of engagement with the other dog lever, pitmen connected with the dog levers, and members connected with the pitmen, one of said members being connected with said first-mentioned change-speed gearing, and the other member being connected with said second-mentioned change-speed gearing.

5. A device of the character described, comprising change-speed gearing for driving a tractor in one direction of its travel, change-speed gearing for driving the tractor in the opposite direction of its travel, a movable member for controlling one of said change-speed gearings, a second movable member for controlling the other of said change-speed gearings, a single hand lever for actuating either of said movable members, and mechanism connected with said single hand lever and controllable thereby for preventing said hand lever from affecting one of said change-speed gearings, while the said hand lever is controlling the other of said change-speed gearings.

6. A device of the character described, comprising a change-speed gearing for driving a tractor in one direction, a change-speed gearing for driving said tractor in the opposite direction, a pair of separate movable members connected with said change-speed gearings for controlling the same, a single hand lever having a predetermined normal idle position, mechanism connected with said hand lever and controllable thereby when said hand lever occupies a predetermined abnormal position for the purpose of controlling one of said change-speed gearings, and mechanism connected with said hand lever and controllable thereby when said hand lever occupies another predetermined abnormal position for the purpose of controlling the other of said change-speed gearings, the said hand lever when in immediate control of one of said change speed gearings being out of position for controlling the other of said change-speed gearings.

7. A device of the character described, comprising a change-speed gearing for driving a tractor in one direction, a change-speed gearing for driving said tractor in the opposite direction, a pair of movable members, each connected with one of said change-speed gearings for actuating the same, a single hand lever for actuating both of said movable members, a pair of dog levers mounted upon opposite sides of said single hand lever and each adapted to be engaged thereby, the parts being so arranged that when said hand lever is in engagement with one of said dog levers, it is out of engagement with the other dog lever, and connections from said dog levers to said movable members.

8. A device of the character described, comprising a change speed gearing for driving a tractor in one direction, a change speed gearing for driving said tractor in the opposite direction, a pair of members each connected with one of said change speed gearings for actuating the same, a pair of levers each connected with one of said members, the said levers being provided with U-shaped lugs, means engaged by the lugs of the said levers to normally hold the said levers in inactive position, and a single hand lever adapted to engage the lug of either of said levers to disengage and actuate the said lever.

9. A device of the character described, comprising a change speed gearing for driving a tractor in one direction, a change speed gearing for driving said tractor in the opposite direction, movable members each connected with one of said change speed gearings for actuating the same, a frame secured to the body of the tractor, a shaft journaled in said frame, a pair of levers carried by said shaft, connections from said levers to said movable members, a sleeve mounted to rock on said shaft, and a single hand lever extending through said frame between the said levers and mounted to rock on said sleeve, said hand lever being adapted to engage and actuate either of said levers.

In witness whereof I have signed my name to this specification in the presence of two subscribing witnesses.

ALVIN ROSS OGBURN.

Witnesses:
A. SHERMAN,
WILLIAM P. BAIR.